March 8, 1927. 1,620,334
R. B. FAGEOL
MULTIBAR BUMPER
Filed June 10, 1925
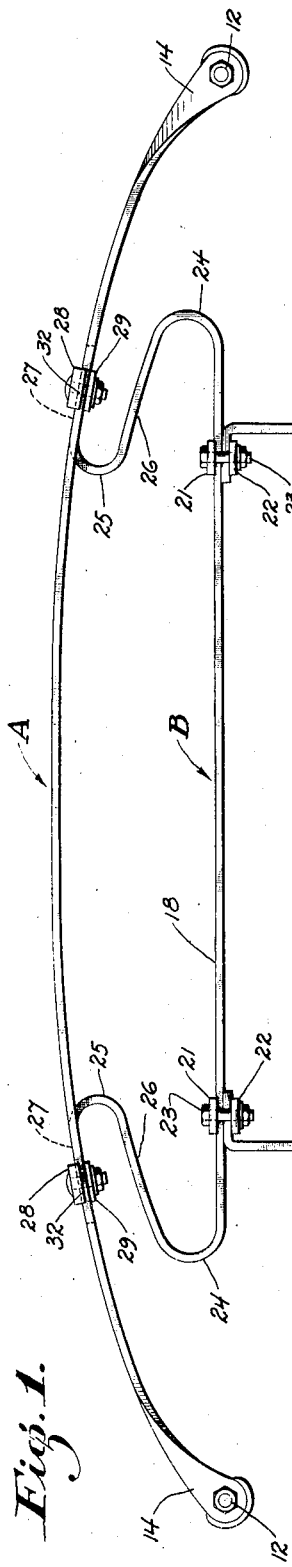
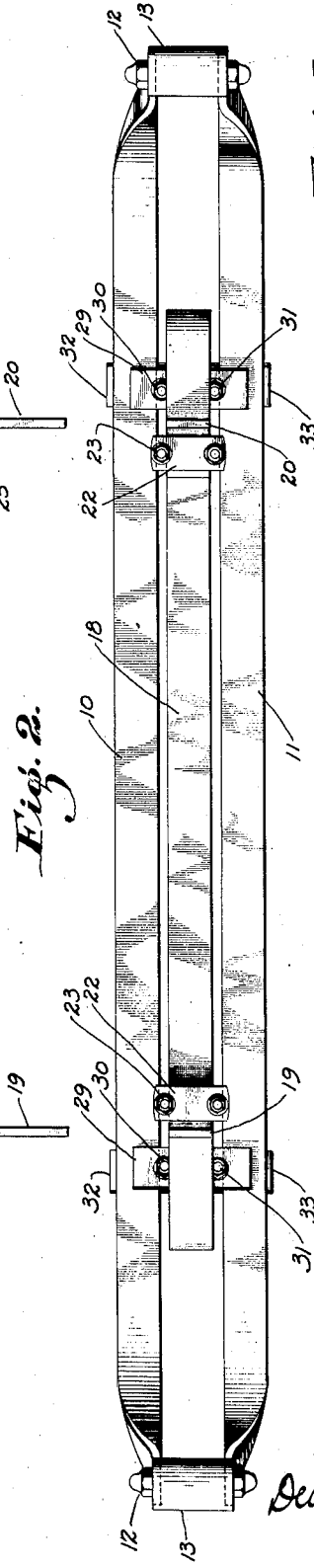
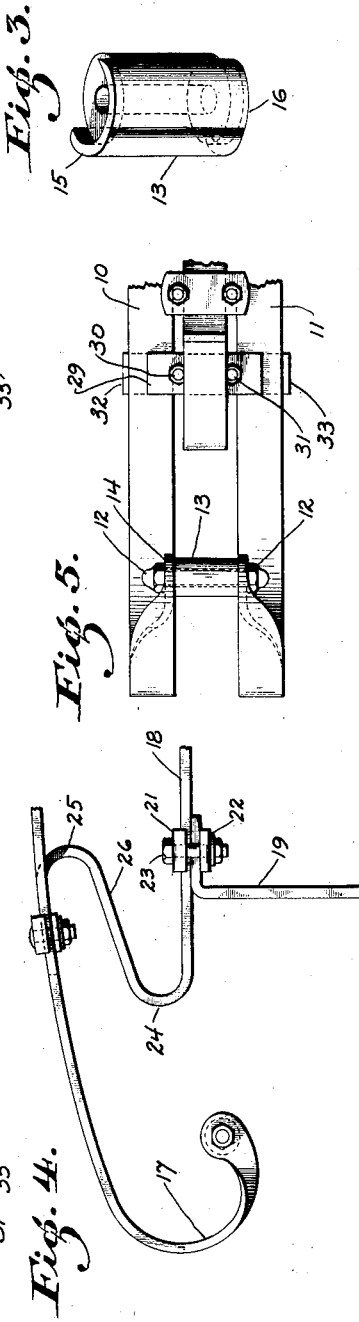
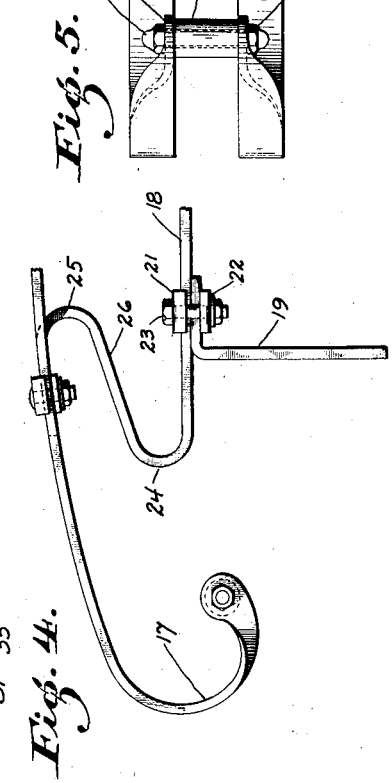
INVENTOR.
Rollie B. Fageol.
BY
ATTORNEYS.

Patented Mar. 8, 1927.

1,620,334

UNITED STATES PATENT OFFICE.

ROLLIE B. FAGEOL, OF LOS ANGELES, CALIFORNIA, ASSIGNOR TO AMERICAN CHAIN COMPANY, INC., OF BRIDGEPORT, CONNECTICUT, A CORPORATION OF NEW YORK.

MULTIBAR BUMPER.

Application filed June 10, 1925. Serial No. 36,097.

This invention relates to automobile bumpers and particularly pertains to a bumper of the all-resilient spring bar type.

It is the principal object of the present invention to provide an all-resilient spring bar bumper having a wide impact area completely across the front of the automobile and being resiliently supported by bumper elements which will permit the bumper to yield to absorb shock delivered to it in all directions in a horizontal plane, the structure being further designed so that in the event the ends of the impact section engage an object either from the front or the rear, the end members will flex and glance off from the object without damage to the object or the bumper.

The present invention contemplates the use of a bumper having a plurality of parallel impact bars extending entirely across the front of a vehicle and being formed with connected free ends shaped in a manner to present a curved surface which will tend to prevent the ends from being caught by an object when the vehicle is moving in any direction, the impact structure being supported by a resilient looped back bar and adjustable mounting brackets.

The invention is illustrated by way of example in the accompanying drawings, in which:

Fig. 1 is a view in plan showing the bumper with which the present invention is concerned.

Fig. 2 is a view in rear elevation showing details of construction of the bumper shown in Fig. 1.

Fig. 3 is an enlarged perspective view of a spacing element used to space and connect the free ends of the bumper bars.

Fig. 4 is a fragmentary view of one end of the bumper formed with a slightly different configuration from that disclosed in Fig. 1.

Fig. 5 is a fragmentary view of the portion of the bumper shown in Fig. 4 as seen in the rear elevation.

Referring more particularly to the drawings, A indicates the impact section of a bumper and B indicates the shock absorbing supporting means for said impact section. The impact section A comprises parallel bumper bars 10 and 11 disposed in the same vertical plane and adapted to be positioned transversely of and horizontally with relation to the end of an automobile frame.

The bumper bars 10 and 11 are of flat stock spring material, their vertical dimensions being greater than their horizontal thickness. These bars may be of any desired plan configuration, as for example, the arcuate shape shown in Fig. 1 of the drawings. The ends of the bumper bars are tied together by bolts 12 and are spaced by spacing blocks 13.

It is common practice at the present time to form spring bar bumpers with free ends presenting a raw end surface. The sharp edges of this end surface readily engage objects with which they come in contact whether the vehicle is moving forwardly or rearwardly, and thus cause the free ends of the bars to be bent.

This has been overcome to a great extent in the present instance by twisting the ends of the bars to bring the normal vertical face of the bar into a horizontal plane as indicated at 14 in the drawings, and with the normal back faces of the ends in horizontal alignment with the contiguous faces of the adjacent bumper bars. The twisted ends are then shaped to produce a semi-circular end face equal in width to the normal vertical width of the bumper. This provides a convex surface of sufficient size to prevent the end of the bumper bar from gouging into the object with which it engages.

In the form of the invention shown in Fig. 5, the spacing block 13 is in the shape of a tubular member having a length equal to the space between the twisted end portions 14 of the adjacent bars and adapted to receive the connecting bolt 12.

In the form of the invention shown in Figs. 1 and 2, the spacing block is of slightly different design, as more clearly indicated in the perspective view of the block shown in Fig. 3. This block is formed with upper and lower flanges 15 and 16, which embrace the convex ends of the twisted portions 14 of the bumper bars, and thus present a convex surface extending from the top of the horizontal twisted portion 14 of the bar 10 to the bottom of the same portion of bar 11.

It will be understood that variation may be also made in the end sections of the bars, as for example, by curving or forming the ends into the scroll 17 shown in Fig. 4.

The impact structure A is supported by the shock absorbing structure B. This as here shown comprises a central straight length of bumper bar 18 extending substantially parallel to the center of the impact structure A and in the rear thereof. Mounting brackets 19 and 20 are adjustably disposed on the straight length 18 and are clamped by means of plates 21 and 22 and clamping bolts 23. By this means the brackets may be moved and set to accommodate vehicle frames of varying widths. The opposite ends of the back bar 18 are formed into reverse loops 24 and 25 connected by a length of bar 26. The loop 25 terminates in a straight portion 27 extending between and lying in the same vertical plane with the bumper bars 10 and 11. This portion 27 is clamped in position between the bumper bars 10 and 11 and immovable with relation thereto by a front clamp plate 28, a rear clamp plate 29 and clamping bolts 30 and 31.

The front clamp plate 28 extends vertically across the front face of the bars 10 and 11 and terminates in upper and lower overhanging flanges 32 and 33 which prevent the bars from spreading with relation to each other. The back plate lies against the back faces of the bars 10 and 11 and is formed with perforations to receive the bolts 30 and 31. By reference to Figs. 2 and 5 of the drawings, it will be seen that these bolts pass through the back plate and then between the adjacent edges of the back bar sections 21 and the front bars 10 and 11 respectively.

In this manner, the bolts after passing through the front plate 28, will serve to rigidly draw the front plate 28 and the back plate 29 together against the opposite sides of the front bars 10 and 11 and the forward portions 27 of the rear bar, and at the same time the bolts will act to space the back bar with relation to the front bar by preventing vertical movement of the portion 27 of the back bar with relation to the adjacent edges of the two front bars.

Further analysis of the bumper structure here shown will disclose the fact that this bumper interposes a wide impact surface completely across the front of a vehicle of a length to protect the body of the vehicle as well as its fenders, and that between the impact structure and the bumper mountings 19 and 20 is interposed a resilient back bar formed with reverse loops at points opposite the mountings, whereby excessive shock of impact delivered in a horizontal plane to the impact structure and which cannot be absorbed by said structure will be transmitted to the looped resilient back bar and will tend to absorb the same and bring the vehicle to rest without damage to the frame.

While I have shown the preferred form of my invention as now known to me, it is to be understood that various changes may be made in its construction without departing from the spirit of the invention as defined in the appended claims.

Having thus described my invention, what I claim and desire to secure by Letters Patent is:

1. An automobile bumper comprising a pair of parallel impact bars formed of flat strip material and arranged in a common vertical plane transversely of an automobile, the ends of said impact bars being free and being twisted to lie in parallel horizontal planes, means spacing covering and connecting said ends, and resilient supporting means for said bumper.

2. An automobile bumper comprising a pair of parallel impact bars formed of flat strip material and arranged in a common vertical plane transversely of an automobile, the ends of said impact bars being free and being twisted to lie in parallel horizontal planes, said ends being rounded, means spacing covering and connecting said ends, and resilient supporting means for said bumper.

3. An automobile bumper comprising a pair of flat strip resilient impact bars disposed parallel to each other and edgewise in a vertical plane, said bars being spaced from each other and having their end portions twisted to form eyes lying in parallel horizontal planes, means connecting said eyes, a back bar formed of flat strip resilient material extending in the rear of and substantially parallel to said impact bars, rear curved loop portions formed at the ends of said back bar and extending forwardly and between the impact bars, clamping members embracing opposite sides of the impact bars and securing the terminating ends of the looped portions of the back bars in the vertical plane of the impact bars, and means for mounting the back bar upon the frame of the vehicle.

4. An automobile bumper comprising a flat strip resilient back bar disposed transversely of a vehicle frame, means for securing the back bar in said position on the frame, reverse loops formed at the opposite ends of the back bar at points beyond the point of connection of the back bar with the frame, the terminating ends of said loops extending outwardly and substantially parallel with the back bar, an impact section for the bumper formed of flat resilient bars disposed parallel to each other in a common vertical plane and upon opposite sides of the terminating portions of the back bar, means for securing the terminating portions of the back bar and the parallel impact bars together in said vertical plane, eye members formed at the ends of the impact bars by twisting the bars so that their ends will lie in parallel horizontal planes, and connecting members for said free ends of the bars comprising substantially cylindrical members having recessed seats at their opposite ends, into which the eyes of the impact bars may seat and by which their edges may be covered, and bolts fastened downwardly through the eyes of the bars, securing the cylindrical members between the bars in a manner to rigidly space said bars and to protect the ends thereof.

ROLLIE B. FAGEOL.